United States Patent Office 2,813,057
Patented Nov. 12, 1957

2,813,057

FUNGICIDAL AROMATIC SULFONHYDRAZIDE COMPOSITION AND METHOD OF USING SAME

Johannes Thomas Hackmann, Amsterdam, Netherlands, assignor to Shell Development Company, Emeryville, Calif., a corporation of Delaware No Drawing. Application January 28, 1954, Serial No. 406,875

Claims priority, application Germany January 8, 1952

10 Claims. (Cl. 167—30)

This invention relates to a method and to a composition for protecting plants from attack by parasitic pathogens, such as fungi and bacteria.

In accordance with the present invention, it has now been found that aromatic sulfonhydrazides having substituted on the aromatic ring an alkyl radical of at least about 8 carbon atoms are particularly effective for protecting plants from attack by parasitic pathogens.

Alkyl-substituted benzenesulfonhydrazides wherein the alkyl radical contains from about 8 to about 22 carbon atoms have been found to be especially suitable as foliage fungicides and bactericides.

It is particularly desirable that the present sulfonhydrazides be free of aromatic substituents directly attached to the nitrogen atoms of the hydrazine molecule. The most suitable substituted hydrazines for use in the invention are those having as the only substituents at least one alkyl aromatic sulfonyl radical wherein the alkyl group contains at least about 8 carbon atoms, preferably from about 8 to about 22 carbon atoms. The alkyl group may be either straight-chain or branched-chain. The aromatic nucleus may be further substituted with such substituents as amino groups, halogen atoms, the cyano group, and the like. Typical examples of suitable compounds include: octylbenzenesulfonhydrazide, nonylbenzenesulfonhydrazide, decylbenzenesulfonhydrazide, undecylbenzenesulfonhydrazide, dodecylbenzenesulfonhydrazide, tridecylbenzenesulfonhydrazide, tetradecylbenzenesulfonhydrazide, pentadecylbenzenesulfonhydrazide, hexadecylbenzenesulfonhydrazide, heptadecylbenzenesulfonhydrazide, octadecylbenzenesulfonhydrazide, nonadecylbenzenesulfonhydrazide, eicosylbenzenesulfonhydrazide, heneicosylbenzenesulfonhydrazide, docosylbenzenesulfonhydrazide, dodecylnaphthalenesulfonhydrazide, tetradecylnaphthalenesulfonhydrazide, hexadecylnaphthalenesulfonhydrazide, heptadecylnaphthalenesulfonhydrazide, octadecylnaphthalenesulfonhydrazide, 2-methyl-4-dodecylbenzenesulfonhydrazide, 2-amino-4-hexadecylbenzenesulfonhydrazide, 2 - chloro - 4 - heptadecylbenzenesulfonhydrazide, 2-ethyl-4-octadecylbenzenesulfonhydrazide, and the like, and mixtures of the foregoing. The alkyl groups in the foregoing compounds can be either straight-chain or branched-chain and can be situated in various positions on the aromatic ring, particularly good results having been obtained with the long chain alkyl radical in the para position. The most suitable sulfonhydrazides for use in the invention are the alkylbenzenesulfonhydrazides in which the alkyl group contains from about 12 to about 18 carbon atoms.

Some of the sulfonhydrazides of the invention possess a systemic action; that is, they penetrate into the plants through which they spread thereby rendering the plants immune or at least less susceptible to the attack of parasitic pathogens. Usually, the immunity lasts a few weeks, for instance, three weeks, after the substances have been absorbed by the plants. In many cases, the toxic agents have a curative effect if the plants are already affected. In many instances, such parts of the plants as develop after application of the agent, such as new shoots, blades, flowers, fruits, etc., become immune for a certain period of time. Although the mechanism behind this systemic action is not clearly understood, it is believed that the systemic agents are converted to some other products within the living plants, the immunity and/or recovery being caused only by certain conversion products. Many of the present sulfonhydrazides appear to have both an external and an internal toxic effect.

The present sulfonhydrazides are characterized by both solubility in water and solubility in organic liquids, particularly hydrocarbon oils, and they possess surface-active properties. In this application, solubility in water denotes a solubility in water of at least 0.01% by weight of 20° C., and solubility in organic liquids denotes a solubility in benzene of at least 0.1%, and preferably at least 0.5%, by weight at 20° C. Surprisingly, it has been found that the combined properties of solubility in water and solubility in oil, which are possessed by the present compounds, are extremely favorable with regard to the efficacy of the compounds as fungicides and bactericides. Although the relationship between these properties is not fully understood, it is possible that an increased power of penetrating the vegetable cells is involved. Due to their oil-soluble characteristics, the present sulfonhydrazides are resistant to weathering which also increases their effectiveness as plant protecting agents.

The present sulfonhydrazides, being basic nitrogen compounds, can form salts with acids and they can be employed in the invention in the form of such salts. Particularly suitable salts are those formed with the inorganic mineral acids. such as hydrochloric acid, sulfuric acid, phosphoric acid, pyrophosphoric acid, etc. Salts of the sulfonhydrazides with organic acids can also be employed.

The sulfonhydrazides need not be employed in a pure condition. Inactive materials in admixtures which have been formed in the commercial preparation thereof can be present. Mixtures of the active agents as can be readily prepared from commercial products are also suitable. In one preparation, as indicated in Beilstein 11 (Sup 2) p. 74 (1950), benzyl sulfonhydrazide was prepared by the reaction of the chloride of benzyl sulfonic acid with hydrazine hydrate in absolute alcohol.

The active agents of the invention can be used alone or in combination with other fungicidal, viricidal, insecticidal or acaricidal materials, the action of which may be either internal or external, with plant nutritives, with plant hormones, and the like. Wetting agents and, if necessary or desirable, stickers can be present. Any conventional wetting agents, for example, alkyl sulfate salts, alkyl aryl sulfonate salts, sulfosuccinate salts, ethers from polyethylene glycols and alkylated phenols, and the like, can be employed. If the active agents are employed in the form of emulsions or suspensions, for example, in water, solvents such as oils, emulsifiers, emulsion stabilizers, and the like, can be added. Materials which suppress the phytotoxic action of the agents, thereby making it possible to utilize unusually high dosages of the pesticidal material, can also be present. For example, glucose is known to protect tomato plants against damage by certain substances having a phytotoxic effect when in concentrated form, such as urea.

The active agents of the present invention can be effectively applied to the plant in various ways, as by (a) contacting parts of the plants above or in the soil therewith, (b) contacting the seed therewith, (c) introducing the agents into the soil near the roots of the plants, or (d) direct introduction of the agents into the plants, for example, through holes or incisions in parts of the plants.

Application to parts of the plants above the soil by means of spraying has proved to be a particularly satisfactory method. Dusting compositions comprising the active agent on a finely-divided solid inert carrier such as talc, chalk, kaolin, and the like, are also suitable. When introducing the agents into the soil, care should be taken that the agents are introduced as near to the roots as possible and that sufficiently high concentrations be absorbed by the components of the soil since the agents might undergo a chemical or microbiological conversion before penetrating into the plants.

Spraying of the plants to be treated is preferably performed with aqueous solutions or suspensions containing an effective toxic amount of the active agent. Aqueous solutions or suspensions containing from about 0.01 to about 5% by weight, and preferably from about 0.01 to about 1% by weight, of the active agents are particularly suitable. Higher concentrations of the fungicidal agents can be employed if no phytotoxic effects are observed. As a rule, however, because of the danger of phytotoxicity, the use of low concentrations is recommended. Although the present sulfonhydrazides are surface-active per se, it may be desirable to add a minor amount, of the order of from about 0.01 to about 0.05% by weight, of another different wetting agent to aid in forming a suspension of the sulfonhydrazide in the aqueous medium. Any of the conventional wetting agents, such as those mentioned above, can be employed. A particularly suitable wetting agent is the sodium salt of a mixture of secondary heptadecyl sulfates, sold commercially under the name of "Teepol." If necessary or desirable, a suitable cosolvent can be employed to promote the solution of the sulfonhydrazide in water. Suitable cosolvents include the relatively low molecular weight ethers, alcohols, and ketones, such as dioxane, diethyl ether, diisopropyl ether, methyl alcohol, ethyl alcohol, isopropyl alcohol, acetone, and the like. The sulfonhydrazides can be formulated as concentrate compositions which can be suitably diluted with water prior to application.

The present sulfonhydrazides can also be utilized as dusts, in solution in organic liquids, and in aqueous emulsions. For their utilization in aqueous emulsions, the sulfonhydrazides are usually formulated as concentrate compositions comprising the sulfanhydrazide dissolved in a suitable organic liquid, such as a hydrocarbon solvent, particularly, a hydrocarbon mineral oil. The concentrate composition is then dispersed in water just prior to application. If desired or necessary, a suitable wetting agent can be added to the concentrate in order to promote dispersion of the concentrate in water. The hydrocarbon solvent employed can be an aromatic hydrocarbon such as benzene, toluene, xylene, naphthalene or a hydrocarbon mineral oil. In order to insure safety from phytotoxic activity, the mineral oil used should have an unsulfonatable residue above about 80%w and preferably above about 90%w. If desired, a suitable cosolvent such as those described above, can be added to the concentrate in order to promote the solubility of the sulfonhydrazide in the hydrocarbon solvent. The concentrates generally contain from about 10% to about 50% by weight of the active ingredient and are usually emulsified in sufficient water to bring the concentration of the active ingredient down to between about 0.01% and about 5% by weight of the total formulation.

The sulfonhydrazides are particularly effective for protecting plants from the attack of parasitic pathogens, some of the more important of which are listed in Table I.

TABLE I

| Latin Name of the Pathogen | English Name of the Disease | Most Important Plants on Which the Disease May Occur |
| --- | --- | --- |
| Cladosporium fulvum | Leaf mould (tomato disease). | Tomato plants. |
| Septoria apii graveolentis | | Celery plants. |
| Phytophthora infestans | Late blight (potato disease). | Potato plants. |
| Colletotrichum lindemuthianum. | Anthracnose | Brown kidney bean plants (Phaseolus vulgaris L.). |
| Exobasidium vexans | Blister blight | Tea plants. |
| Erysiphaceae (various species). | Mildew | Various plants, e. g., apple trees. |
| Uredinales (various species) | Rust | Corn species. |
| Fusarium (various species) | Wilt disease | Cucumber plants. |
| Ceratostomella ulmi | Dutch elm disease | Elm trees. |
| Pseudomonas (various species, e. g., Agrobacterium tumefaciens). | Crown gall | Tomato and many other plants. |

All of the pathogens mentioned in the foregoing table are fungi, except the last which is a species of bacteria. The activity of the toxic compounds of the present invention was, in general, determined by the following method:

Test plants were sprayed with an aqueous solution of the agent until the liquid dropped from the leaves. After the spray liquid dried, usually after about two days, the plants were exposed to contamination. In all cases, a part of the test plant who also treated prior to contamination, with artificial rain consisting of tap water containing about 0.2% by weight of 'Teepol" in order to completely remove the spray liquid from the surface of the leaves of the plants.

Depending on the kind of test plant and of the kind of fungus, contamination was effected either by inoculation of the plant or by placing the plant in contaminated surroundings, for example, in a greenhouse in which plants affected by the fungus were present. Conditions were such that the untreated plants soon became diseased. After a certain period had elapsed, depending on the plant tested, the ratio of the affected leaf surface to the total leaf surface was determined for both the treated and the untreated plants. The quantity obtained by subtracting the quotient of these two numbers from one is a measure for the degree to which suppression of the pathogen has succeeded. Hereinafter, this quantity, expressed in percent, will be termed the degree of suppression. The degree of suppression was determined at a time at which the untreated plants showed clear symptoms of the disease. As a rule, the leaf surfaces were not measured, but estimated with the required accuracy. An experienced person can in this way determine the degree of suppression with an error of about 5%. This accuracy is sufficient since, in general, results obtained in biological tests are only reproducible within rather wide limits.

The invention is illustrated by the following examples which are not to be construed as limiting the specification and claims in any manner.

*Example I*

Five grams of crude n-dodecylbenzene-p-sulfonhydrazide were dissolved in 50 cc. of ethyl alcohol. To this solution, 950 cc. of water were added, and the resulting dispersion was sprayed on potato plants, one month old, until the liquid dripped from the leaves. The plants were then infected with *Phytophthora infestans*. In case A, the plants had been kept dry for three days before being sprayed, whereas in case B the plants had been kept moist before being sprayed. For purposes of comparison, a 0.75% w. suspension of copper oxychloride was also tested. The results are given in Table II.

TABLE II

| Agent | | Concentration, percent w. | Degree of Suppression, percent |
|---|---|---|---|
| A | n-Dodecylbenzene-p-sulfonhydrazide | 0.5 | 92 |
|   | Copper oxychloride | 0.75 | 56 |
| B | n-Dodecylbenzene-p-sulfonhydrazide | 0.1 | 75 |
|   |  | 0.5 | 78 |
|   | Copper oxychloride | 0.75 | 48 |

Example II

Tomato plants, two months old, were sprayed with a 0.1% w. aqueous solution and with a 0.5% aqueous colloidal solution of n-dodecylbenzene-p-sulfonhydrazide. The plants were then infected with *Phytophthora infestans*. For purposes of comparison, copper oxychloride was also tested. The results are given in Table III.

TABLE III

| Agent | Concentration, percent w. | Degree of Suppression, percent |
|---|---|---|
| n-Dodecylbenzene-p-sulfonhydrazide | 0.1 | 75 |
|  | 0.5 | 98 |
| Copper oxychloride | 0.75 | 75 |

Example III

Celery plants, 20 cm. high, were sprayed with a 0.5% w. aqueous colloidal solution of n-dodecylbenzene-p-sulfonhydrazide, 100 cc. of solution being applied per square meter of area of soil. After two days, the plants were placed in a damp greenhouse and inoculated with spores of *Septoria apii graveolentis*. Three weeks later, a degree of suppression of 86% was observed.

Example IV

The fungicidal action of a branched-chain dodecylbenzene-p-sulfonhydrazide was determined against *Phytophthora infestans* of tomatoes and *Phytophthora infestans* of potatoes. A 0.5% w. aqueous solution was employed. The branched-chain dodecyl radical was derived from propylene tetramer and probably conforms to the following structure:

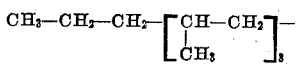

The degrees of suppression observed were 60% and 80%, respectively.

Example V

Rye plants, about 10 days old, were sprayed with 0.5% w. solutions of commercian n-dodecylbenzene-p-sulfonhydrazide and of branched-chain dodecylbenzene-p-sulfonhydrazide (as in Example IV) at a dosage of about 70 cc. per square meter of soil area. A few days later, the plants were placed in a damp room and were inoculated with a suspension of acidio-(fruit body)-spores of *Duceinia graminis* (a type of mildew). Three weeks later, the attack by mildew was determined. The degrees of suppression were found to be 93% and 87%, respectively.

Equally effective results were obtained in the aforementioned tests with n-decylbenzene-p-sulfonhydrazide, n-tetradecylbenzene-p-sulfonhydrazide, n-hexadecylbenzene-p-sulfonhydrazide, n-heptadecylbenzene-p-sulfonhydrazide, and n-octadecylbenzene-p-sulfonhydrazide.

This application is a continuation-in-part of the copending application of J. T. Hackmann, Serial No. 329,933, filed January 6, 1953 and now abandoned.

I claim as my invention:

1. A method of protecting plants from attack by parasitic pathogens which comprises treating the plants with n-dodecylbenzene-p-sulfonhydrazide.

2. A method of protecting plants from attack by parasitic pathogens which comprises treating the plants with a branched-chain dodecylbenzene-p-sulfonhydrazide.

3. A method of protecting plants from attack by parasitic pathogens which comprises treating the plants with a dodecylbenzene-sulfonhydrazide wherein said dodecyl group is unsubstituted and said sulfonhydrazide is free of aromatic substituents attached directly to the nitrogen atoms of hydrazine.

4. A method of protecting plants from attack by parasitic pathogens which comprises treating the plants with an alkylbenzene-sulfonhydrazide wherein the alkyl radical is unsubstituted and contains from about 12 to about 18 carbon atoms and said sulfonhydrazide is free of aromatic substituents attached directly to the nitrogen atoms of hydrazine.

5. A method of protecting plants from attack by parasitic pathogens which comprises treating the plants with an aromatic sulfonhydrazide having substituted on the aromatic ring an unsubstituted alkyl radical of 8 to 22 carbon atoms, said aromatic ring being choosen from the group consisting of benzene and naphthalene, and wherein said sulfonhydrazide is free of aromatic substituents attached directly to the nitrogen atoms of hydrazine.

6. A composition suitable for protecting plants from attack by parasitic pathogens which comprises a dodecylbenzenesulfonhydrazide wherein said dodecyl group is unsubstituted and said sulfonhydrazide is free of aromatic substituents attached directly to the nitrogen atoms of hydrazine and a minor amount of wetting agent suitable for dispersing the composition in an aqueous medium.

7. A composition suitable for protecting plants from attack by parasitic pathogens comprising an alkylbenzene-sulfonhydrazide wherein the alkyl radical is unsubstituted and contains from about 8 to about 22 carbon atoms and said sulfonhydrazide is free of aromatic substituents attached directly to the nitrogen atoms of hydrazine and a minor amount of a wetting agent suitable for dispersing the composition in an aqueous medium.

8. A composition suitable for protecting plants from attack by parasitic pathogens which comprises an aromatic sulfonhydrazide having substituted on the aromatic ring an unsubstituted alkyl radical of at least about 8 carbon atoms, said aromatic ring being chosen from the group consisting of benzene and naphthalene, and wherein said sulfonhydrazide is free of aromatic substituents attached directly to the nitrogen atoms of hydrazine, and a minor amount of a wetting agent suitable for dispersing the composition in an aqueous medium.

9. A composition suitable for protecting plants from attack by parasitic pathogens which comprises an alkylbenzenesulfonhydrazide wherein the alkyl radical is unsubstituted and contains from about 8 to about 22 carbon atoms and said sulfonhydrazide is free of aromatic substituents attached directly to the nitrogen atoms of hydrazine and a finely-divided, solid inert carrier.

10. A composition suitable for protecting plants from attack by parasitic pathogens which comprises an aromatic sulfonhydrazide having substituted on the aromatic ring an unsubstituted alkyl radical of at least about 8 carbon atoms, said aromatic ring being chosen from the group consisting of benzene and naphthalene, and wherein said sulfonhydrazide is free of aromatic substituents attached directly to the nitrogen atoms of hydrazine, and a finely-divided, solid inert carrier.

References Cited in the file of this patent

UNITED STATES PATENTS

| 2,405,743 | Gertler | Aug. 13, 1946 |
| 2,640,853 | Sundholm | June 21, 1953 |